Nov. 18, 1930.  K. WICHTENDAHL  1,782,082

GAMBREL

Filed Dec. 12. 1929

INVENTOR
Karl Wichtendahl
BY
Siggers & Adams
ATTORNEYS

Patented Nov. 18, 1930

1,782,082

UNITED STATES PATENT OFFICE

KARL WICHTENDAHL, OF GOTHA, FLORIDA

GAMBREL

Application filed December 12, 1929. Serial No. 413,553.

This invention relates to gambrels and, among other objects, aims to provide an improved relatively simple, cheap, strong and durable device which will enable one man to handle a carcass.

Other aims and advantages of the invention will appear in the specification when considered in connection with the accompanying drawing, wherein.

Heretofore, various and more or less complex as well as expensive gambrels have been devised, but all of those devices of which I am aware are subject to some practical disadvantages. Some of them are inherently weak so that they are unsuited for suspending heavy carcasses; others are provided with a multiplicity of pivoted links and/or braces which introduce an element of danger in using them because of the possibility of physical injury when the arms are opened or closed; while many of them fail to make any provisions to prevent an unbalanced carcass or a part thereof from slipping off one or both of the hooks. In most of them, it requires two men to handle a carcass. My improved gambrel is therefore especially contrived to overcome the foregoing objections and is so designed that it has maximum strength and durability. Also, one of the important aims is to provide a device which will enable one man to handle a whole or even a quartered carcass with perfect safety and without any possibility of having an unbalanced carcass slip off the hooks.

Figure 3:
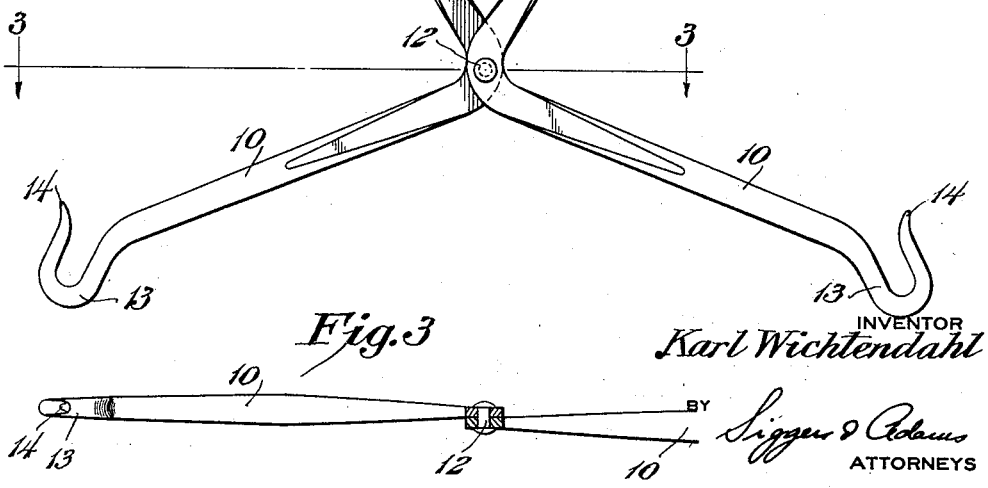
Fig. 3 is a sectional view taken on the line 3—3 of Fig. 2.

Referring particularly to the drawing, the illustrative device is there shown as including a pair of substantially identical L-shaped arms 10 conveniently forged out of round bars of steel and having flattened portions 11 at the elbows or bends where the arms are pivoted together by means of a pivot bolt or pin 12 (Fig. 3). The flattened portions are preferably so made they will bind against each other when the arms are opened as wide as is desired, thus avoiding any danger of pinching or cutting one's hands or fingers between them.

The lengths of the leg engaging arms as well as the size of the stock used may be selected to suit the kinds of carcasses to be handled. In all cases, however, the leg-engaging ends are reduced and bent to form deep hooks 13 having their bight portions extending outwardly at an angle to the vertical, while their bills extend inwardly, terminating in pointed, outwardly bent ends 14. The construction of the hooks is such that a carcass cannot slip off even though all of the weight might be carried by only one of them.

The ends of the arms above the pivot are shown as having eyes 15 to which are connected the end links of a chain 16 of such length as to permit hooks to close as far as is desired without collapsing. The chain has a ring 17 midway between its ends to receive the hook of a suitable hoisting device such as a block and tackle not shown.

Figure 1:
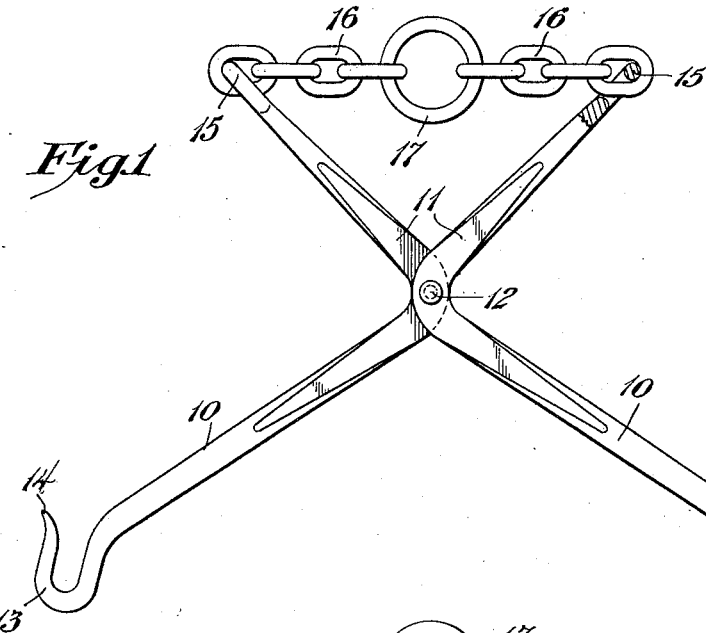
Fig. 1 is a side elevation of the preferred embodiment of the invention.
Figure 2:
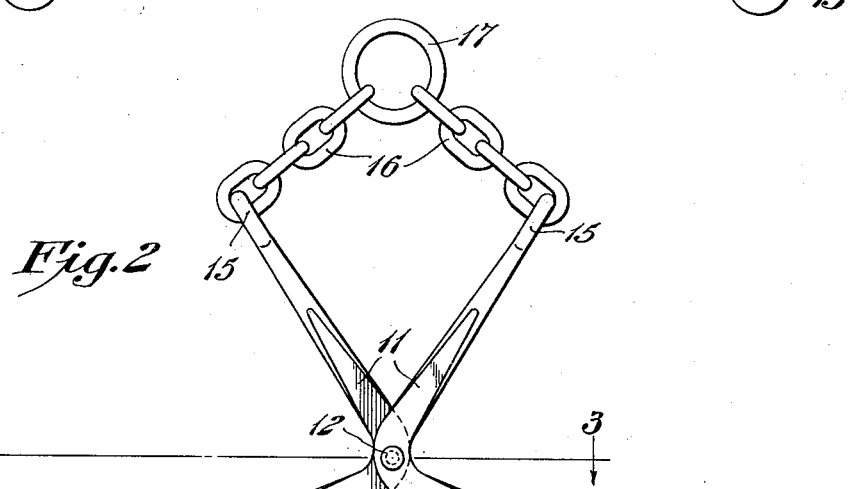
Fig. 2 is a view similar to Fig. 1, but showing the parts in another position.

Now it will be seen that the hooked ends are adapted to be engaged in the legs or ligaments of a carcass and initially hold the legs spread apart to some extent. When the carcass is raised, the chain will pull the upper parts of the arms toward each other and automatically spread the hooked ends and the legs of the carcass. The parts will assume approximately the positions shown in Fig. 2. If a greater portion of the weight is carried by one of the hooks, that hook will tend to swing down toward a vertical line passing through the ring; but the carcass cannot slip off.

From the foregoing description, it will be seen that the device can be manufactured very cheaply of a minimum number of parts; that it has very great strength and requires no special links; that there are no parts which are likely to be broken; and that it can be safely used by one man to suspend very heavy carcasses.

Obviously, the present invention is not restricted to the particular embodiment thereof herein shown and described.

What is claimed is:

A gambrel comprising a pair of substantially L-shaped arms forged out of round metal bars pivoted together at their elbows and having flattened portions adjacent to the pivot to permit limited opening movement; hooks having outwardly extending, deep bight portions formed on the lower ends of said arms; eyes on the upper ends of the arms; a chain connected to the eyes limiting the closing movement of hooked arms; and a hook-receiving ring in said chain whereby it may be suspended and the weight of the carcass will automatically open the hooked arms.

In testimony, that I claim the foregoing as my own, I have hereto affixed my signature.

KARL WICHTENDAHL.